United States Patent [19]

Jacobson

[11] 4,267,731

[45] May 19, 1981

[54] FORCE BALANCED VIBRATORY RATE SENSOR

[75] Inventor: Peter E. Jacobson, Phoenix, Ariz.

[73] Assignee: Sperry Corporation, New York, N.Y.

[21] Appl. No.: 120,179

[22] Filed: Feb. 11, 1980

[51] Int. Cl.³ ............................................. G01C 19/56
[52] U.S. Cl. ..................................................... 73/505
[58] Field of Search ............................ 73/505; 74/5 R

[56] References Cited

U.S. PATENT DOCUMENTS 3,992,952   11/1976   Hutton et al. .......................... 73/505

Primary Examiner—James J. Gill

Attorney, Agent, or Firm—Howard P. Terry

[57] ABSTRACT

A vibratory inertial rate of turn sensor employs force feed back for maintaining the free end of a vibrating cantilever in a nulled lineal path when subjected to a turn about the beam axis, the electrical signal required for nulling being a measure of rate of turn of the craft. The output signal demodulation self-tracks the beam resonance frequency and the beam drive and null terms balance one another, tending to maintain the sensor scale factor constant over time and temperature. A unique pick-off and beam primary drive and restoring force drive configuration is provided.

15 Claims, 9 Drawing Figures

FORCE BALANCED VIBRATORY RATE SENSOR

CROSS REFERENCE TO RELATED APPLICATIONS

The present application is related to the pending P. E. Jacobson U.S. patent application Ser. No. 80,757, filed Oct. 1, 1979, entitled: "Force Balanced Vibratory Rate Sensor," and assigned to Sperry Corporation

BACKGROUND OF THE INVENTION

1. Field of the Invention

The invention relates to inertial rate sensors and more particularly to vibratory rate of turn sensor devices of a type employing force feed back techniques, thereby maintaining motion of a vibratory element in a lineal or nulled path with respect to the sensing axes under turn-induced disturbing forces, a measure of the force feed back being a measure of the disturbing force and hence of the turn rate.

2. Background of the Invention

The present invention is an improvement over the closed-loop vibrating rate sensor disclosed in the above referenced pending application which, in turn, is broadly related to vibrating rate sensors of the general types disclosed in U.S. reissue Pat. No. 22,409, dated Dec. 21, 1943 to J. Lyman and E. Norden, assigned to Sperry Corporation.

As disclosed in the pending application with respect to piezoelectric or piezoceramic devices, operation is based upon electrical-charge mechanical-strain phenomenon in the material, usually referred to as having a coupling coefficient, which phenomenon may be employed to vibrate a mass thereby to develop linear momentum in the mass. In open loop sensors which use the high resolution of this energy conversion mechanism, the drift and scale factor characteristics are dependent upon, among other characteristics, the stability and properties of the piezoelectric material coupling coefficient. Thus, use of piezoelectric devices in inertial instruments has been hampered by drift in stability and scale factor inconsistencies, to be overcome only to a degree in the past by intensive development of relatively stable piezoelectric materials and application thereof in particular sensor designs. These improved materials, when configured in accordance with the present vibrating rate sensor concepts, together with the shape and manner in which the vibratory element and its associated pick-off electrodes and driving elements are arranged relative thereto, provide substantial improvements in the overall operating characteristics of the sensor, including reduced cross-coupling effects between the drive and nulling axes, reduced environmental temperature sensitivity, reduced susceptibility to environmental vibrations, and over-all improvement in sensor scale factor.

SUMMARY OF THE INVENTION

The present invention provides a closed loop inertial rate of turn sensor of the vibratory type employing force feed back techniques and includes an elongated rod or beam cantilevered on a mounting element, the latter being driven about one axis to cause sustained vibration of the free end of the beam at its resonant frequency in a preferred plane. A pick-off device is provided to sense components of vibration out of the plane produced by Coriollis-induced acceleration effects or forces when the base is subjected to a rate of turn about the nominal axis of the beam, the base being driven in an orthogonal direction at the beam resonant frequency to force the beam vibration back into the preferred plane, a measure corresponding to the latter force being proportional to rate of turn.

More particularly, the invention consists generally of a tubular piezoelectric drive member supported or cantilevered at one end of a sensor mount or support and having quadrantal, elongated longitudinal slots dividing its other end into four individual equally spaced actuator columns. The opposed pairs of columns generally lie symmetrically in and along intersecting orthogonal planes constituting a drive plane and a nulling plane. A concentrically disposed resilient vibratory beam or rod is supported, also in cantilever fashion, by the ends of the four actuator columns so as nominally to lie on the axis defined by the intersecting planes and so as to be driven at the natural frequency of the rod by suitably energizing the piezoelectric columns. A dual axis, capacitive pick-off system secured to the mount or support adjacent the free end of the column senses the instantaneous position thereof relative to the axes. By locating the mounting point or support end of the piezoelectric drive member proximate the pick-off system, undesired thermal expansion effects are minimized, as well as those brought about by variations in mounting geometry. By allowing the beam-mass frequency to vary with time and temperature through providing a resonance-tracking electronic system, the scale factor remains essentially constant. The scale factor of the sensor may be further enhanced by shaping the beam so that its natural resonant frequency in its nulling or output plane is slightly higher than that in the driving or input plane.

DESCRIPTION OF THE PREFERRED EMBODIMENTS

Figure 1:
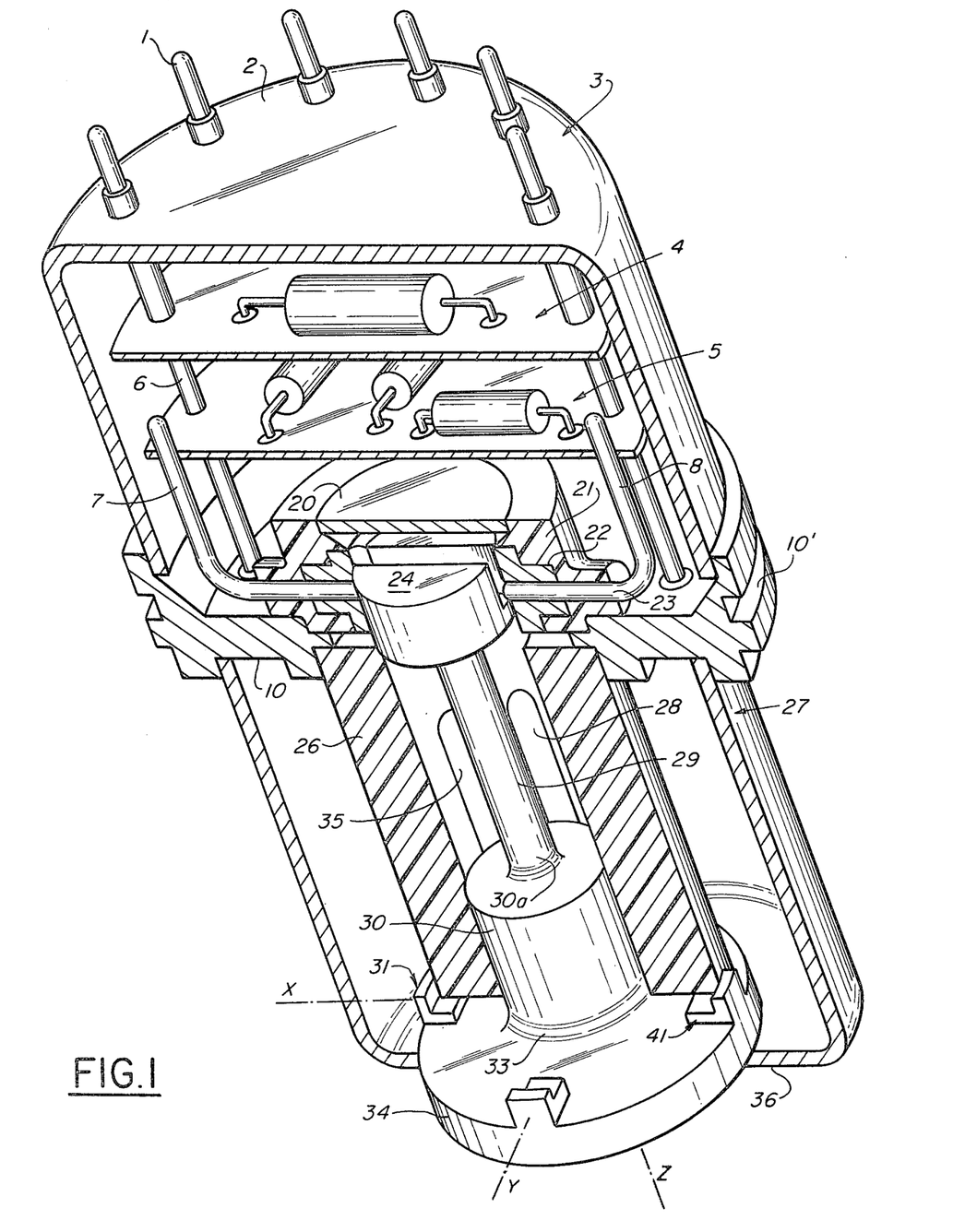
FIG. 1 is a pespective view, partly in cross section, of a preferred form of the invention.
Figure 2:
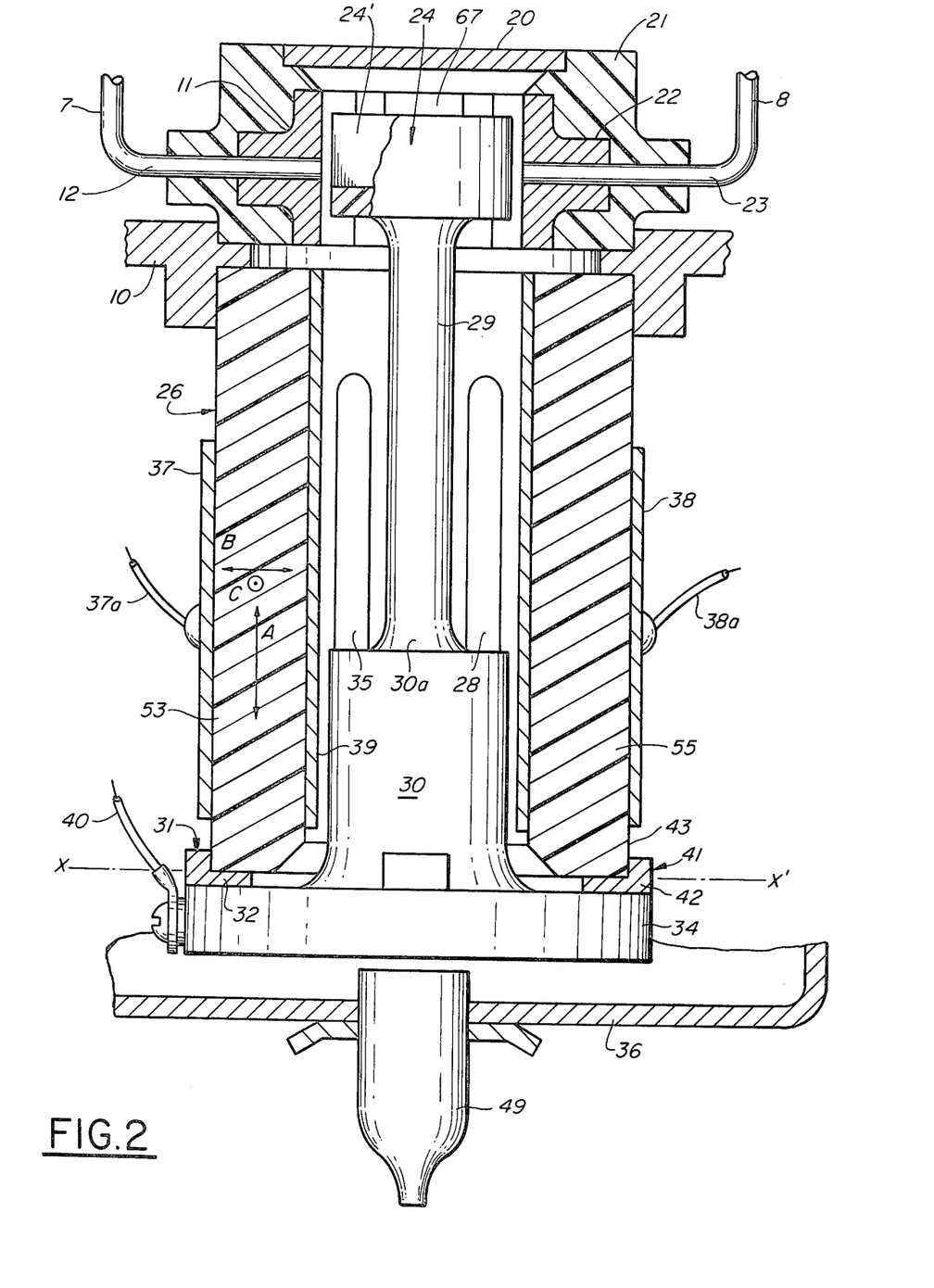
FIG. 2 is an enlarged elevation view, partly in cross section, of the sensor structure illustrated in FIG. 1.
Figure 3:
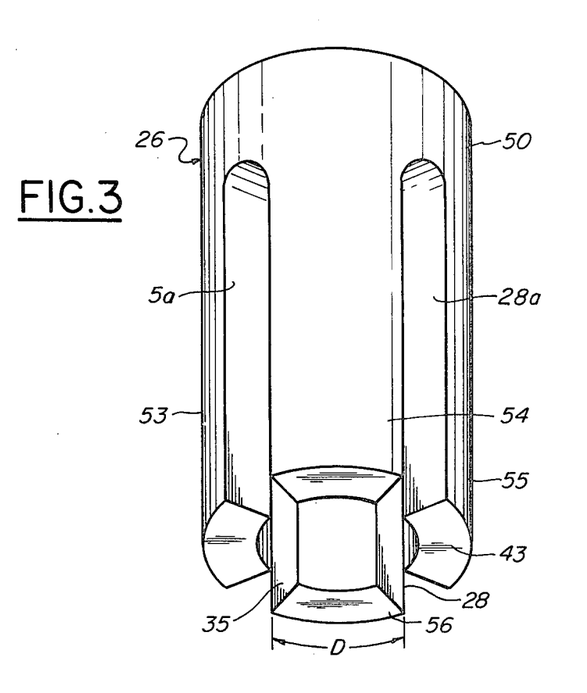
FIG. 3 is a perspective view of the drive member shown in FIGS. 1 and 2.

A preferred embodiment of the improved rate sensor of the present invention is illustrated in FIGS. 1 and 2. In general, it comprises a main generally-circular support member 10 having suitable mounting surfaces 10' for fixedly mounting the sensor on a suitable fixed mounting structure in the vehicle. Support member 10 also includes suitable flanges for supporting upper and lower cup-shaped housing members 3 and 27, respectively defining upper and lower housing chambers. The lower chamber contains the dynamic elements of the sensor, while the upper chamber contains the sensor's passive electronic circuits.

The dynamic elements of the sensor include a vibratable element in the form of a beam or rod 29 integrally supported in cantilever fashion at the general center 30a of a pedestal 30. Integral with pedestal 30 is a circular disk-line portion or flange 34. The free end of cantilever beam 29 opposite elements 30 and 34 is formed to provide a generally cylindrically shaped inertial mass 24. The mass cylinder 24, cantilever beam 29, cylinder 30, and disk 34 are preferably fashioned from a material having an elastic modulus essentially insensitive to temperature such as, for example, a material commonly available under the trade mark "Invar" and including iron-nickel alloys containing 40 to 50 percent nickel. The beam and mass dimensions of the vibratable element are selectedd to provide a predetermined nominal natural frequency of vibration in the drive axis. Since the assembly forms part of an electrical pick-off system, it is to be in part electrically conducting, so that it supplies a path for electrically grounding mass 24 through flange 34 and electrical lead 40 (FIG. 2). Operation of the cantilevered beam 29 will be described in terms of a pair of mutually perpendicular axes XX', YY' normal to the axis ZZ' of symmetry of beam 29. The simple geometry of the vibratory system lends itself well to precise manufacturing techniques and significantly reduces potential drift problems. The axis of symmetry of beam 29, when the device is at rest, normally coincides with the ZZ' axis about which rates of turn are to be measured and may be referred to as the sensing axis.

The flange portion 34 integral with the vibratable member 29, 30 includes four hinge pads 32, 41, et cetera, disposed equally about the periphery of flange 34 and having an upward extending lip and a base part preferably formed integrally with flange 34. The four spaced angle pads 32, 41 form mounting seats for flexibly securing flange 34 to the lower ends of the piezoelectric drive elements, as will be described. The piezoelectric drive elements are formed from cylinder 26 which is formed into quadrants from a single piezoelectric matrix, thereby providing four independent piezoelectric actuator columns or elements 53, 54, 55, and 56, formed by machining four equally spaced elongated slots 28, 35, 28a, 35a parallel to the axis of hollow cylinder 26. The A, B, and C axes of the piezoelectric element are illustrated in FIG. 2.

The actuator legs 53, 54, 55, and 56 are mutually independent and flange 34 is affixed permanently to the seats formed by hinge pads 32, 41. However, it should be particularly noted that by forming the individual legs from a single piezoelectric or piezoceramic cylinder, they faithfully track one another with time and temperature and hence exhibit essentially identical response to driving and nulling voltages, rendering the sensor scale factor essentially constant with these varying parameters. The actuator legs or columns may be electrically extended or contracted in the A direction by applying electrical fields to them in the B direction, as will be described. The solid or full cylindrical end of piezoelectric drive cylinder 26 opposite flange 34 is affixed to apertured plate 10, which forms the support ring for the active elements of the instrument. Support ring 10 may also include suitable seats for enclosing cup-shaped casings 3 and 27 in a generally conventional manner. The lower enclosure may be evacuated and desirably back-filled with an inert gas such as nitrogen by means of a pinch-off tube 49 hermetically sealed in the flat base 36 of cup-shaped casing 27. It is desirable to provide a gas medium in the enclosure in order to provide a clean, dry atmosphere for the capacitive pick-offs 11, 22, 24, 67, and 68.

Each of the coplanar piezoelectric actuator columns or legs 53 to 56 is provided with suitable energizing electrodes for cyclically and alternately extending or contracting them. For this purpose, the inner surface of hollow piezoelectric drive cylinder 26 is provided with a continuous inner electrode 39 which may, for example, be an electro-deposited silver film. In practice, pads 32, 41, et cetera, which are narrow relative to the base dimension of each of the actuator columns 53 to 56, are secured to the columns with a gyro grade epoxy resin adhesive. This cement noramlly has a Young's modulus twenty times less than that of the columns and the pads, thereby providing a relatively flexible hinge-like connection which allows the rigid flange and thereby beam 29 to tilt about axes X, X' and Y, Y' in response to differential changes in lengths of the columns.

Figure 5:
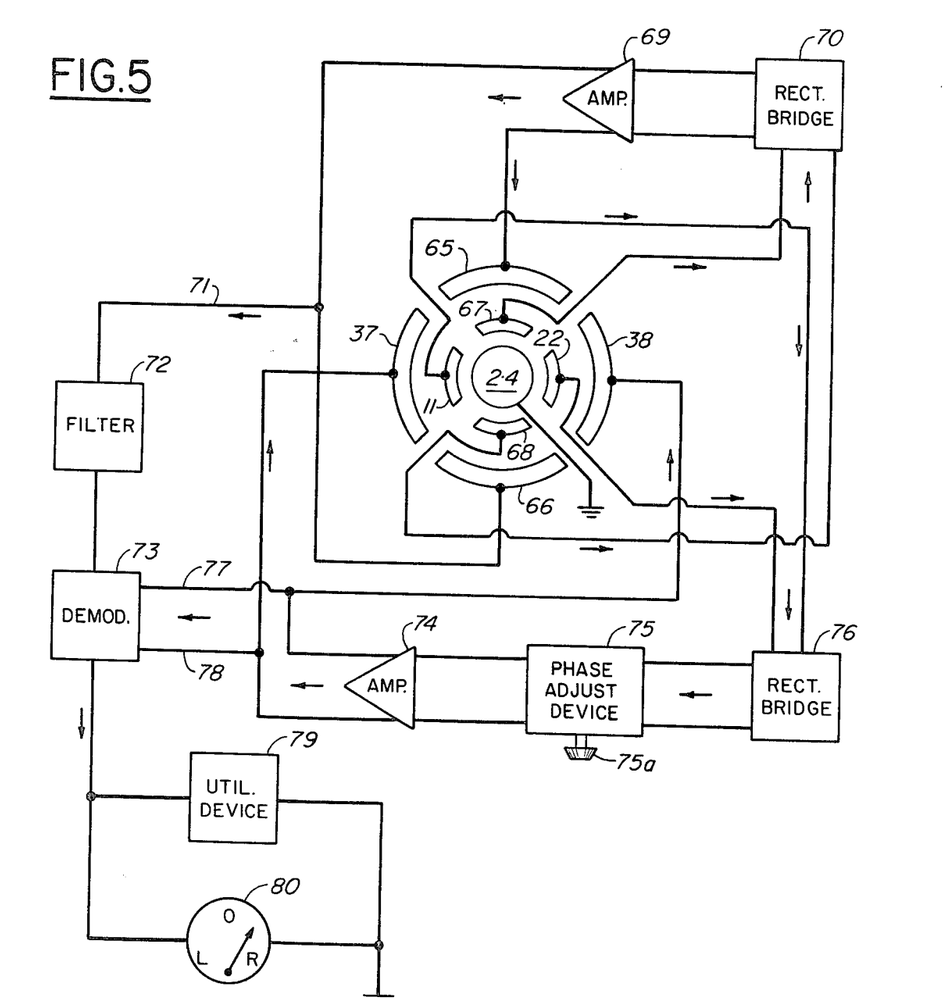
FIG. 5 is an electrical wiring diagram showing basic electrical components of the invention and their interconnections.

On the exterior surface of each of the piezo-electric legs is an elongate arcuate electrode such as electrodes 37, 38 of FIG. 2 (as shown schematically in FIG. 5). Four such electrodes are used in cooperating pairs, as at 37, 38 and 65, 66. The several electrodes 37, 38, 65, 66 may also be electro-deposited silver and are disposed in electrically insulated relation from the continuous inner electrode 39. While only the electrodes 37, 38 associated with actuator legs 53, 55 have been discussed in detail, it will be understood that a second pair of such electrodes 65, 66 is provided on legs 54, 56 in a similar manner, as suggested in FIG. 5. In practice, prior to cutting the slots in the piezoelectric cylinder, it may have its interior surface completely plated and its exterior surface similarly plated in the areas indicated and the cylinder is thereafter machined to form slots 28, 35, 28a, 35a and the resulting separated legs 53, 55, 54, 56 with their associated electrodes. The piezoelectric material is preferably readily available polycrystalline lead titanate zirconate or a similar material. Thus, the legs 53, 55, 54, 56, if electrically polarized along the B axis, exhibit a shear strain in the A direction so that, by controlling the sense of the polarizing voltage, the shear strains in legs 53, 55 and 54, 56 are made opposite to each other and, when one expands the other contracts. While many materials exhibit piezoelectric properties, it is preferred to use materials such as lead titanate zirconate compositions because of their high electromechanical coupling, temperature stability, and relatively slow aging characteristics. It is thus seen that the piezoelectric driver cylinder 26 provides four quadrantally spaced, paired piezoelectric actuator legs for moving the sensing beam about the XX' and YY' axes by tilting flange 34 through hinge pads 31, 41, et cetera. It will be understood, of course, that axis 22', while shown in the drawings as generally vertical, may be oriented in a vehicle in any desired orientation depending upon the direction of the axis about which rate is to be sensed.

Referring particularly to FIG. 2, a driving voltage for actuator legs 53 and 55 may be imposed across electrodes 37 and 38 by means of leads 37a, 38a, ohmically connected thereto as by soldering. Since the upper end cylinder 26 is fixed, actuator leg 53, when suitably energized through electrodes 37, 38, may be caused to expand along the A axis, moving the left side of disk 34 downward and consequently tilting disk 334 through hinge pad 31. Simultaneously, the diametrically opposed actuator leg 55 contracts along the A axis, moving the right side of disk 34 upward through hinge pad 41. The mass 24 of the vibratile rod 29 is accordingly moved toward the left about axis YY' through movement of pedestal 30. The corresponding diametrically opposed electrodes 65, 66 on driver legs 54, 56 similarly operate in phase opposition and will similarly move mass 24 about the XX' axis, as in FIG. 5. It will be noted that the hinge pads coupled between the piezoelectric actuator legs, being flexible, nearly point contacts, tend to isolate the driving forces from the nulling forces.

Up to this point, the dynamic elements of the sensor have been described. Turning again to the fixed elements of the sensor, the basic fixed element is the ring support member 10 which includes suitable mounting surfaces 10' for fixedly mounting the sensor on a suitable fixed mounting structure in the aircraft. Support member 10 also includes suitable support flanges for the protective covers 3 and 27, as described, as well as a support for the standoff rods, such as rods 1 and 6 for mounting printed circuit boards 4, 5, which rods also serve as electrical conductors, some of which protruding through cover 3 for providing electrical communication to the interior of the sensor, all in a generally conventional fashion familiar to those skilled in this art.

Support member 10 includes a lower annular mounting surface to which the upper end of the drive cylinder 26 is rigidly secured as by a suitable epoxy resin adhesive. On the upper surface member 10, a further annular mounting surface is provided to which the electrical pick-off assembly 21 of the sensor is secured, again as by a suitable epoxy resin adhesive. As shown, pick-off assembly 21 comprises four arcuate, equiangularly spaced pick-off plates 11, 22, 67, 68 radially drilled out to receive copper conductor wires 12, 23, et cetera, moulded in a suitable material and machined to provide an internal cylindrical opening or cavity interiorly exposing the surfaces of the pick-off plates and to provide exterior support for the conductor wires, a mounting surface for securing to the support member 10, and an annular indented upper cut-out for receiving a sealing plate 20 for sealing the lower interior volume of the sensor from the upper volume thereof containing electronic circuits 4 and 5. This design provides hermetic isolation of the sensor dynamic elements from the electronic circuits and facilitates servicing the circuits without disturbing the sensing elements. It will be noted that the cylindrical inertial mass 24 of the vibrating element of the sensor projects into the cylindrical pick-off opening so as to cooperate with plates 11, 22, 67, 68 to provide two capacitive pick-offs for detecting the directions of vibrating motion of the vibrating elements. It will also be noted that pick-off assembly 21 is so disposed on the support member 10 that the plates 11, 22 and 67, 68 are precisely aligned with the XX' axis and the YY' axis, respectively, so that detected directions of vibration components of the vibrating element and corresponding electrical signals are parallel with the XX' and YY' axes. These pick-off signals are electrically processed by circuits 4, 5, as will be described. It will be further noted that, in accordance with the present invention, sensor support member 10, inertial mass 24, and pick-off plates 11, 22, 67, 68 all lie in the same general horizontal area; that is, they lie in a substantially common horizontal plane. This design is very effective in maintaining the sensor's scale factor essentially constant under ambient temperature variations and local vibration environments.

Leads 12, 23, et cetera, which project from the periphery of pick-off assembly 21 as at 7 and 8, are connected to printed circuit boards 4, 5 containing the electronic circuits yet to be described. Power inputs and data outputs from circuits 4, 5 may be provided by conventional pin connectors such as pin 1 in the end 2 of cup 3; mechanical support for the boards 4, 5 may be provided by conventional means, such as by extensions 6 of the pin conductors.

Referring to FIG. 2, assume that the sensor is not turning about the sensing axis ZZ' and that excitation alternating voltages are applied between the respective electrodes 37, 38 and common electrode 39 in such relative phases as to cause actuator legs 53, 54 cyclically to expand and contract in mechanical push-pull fashion and causing mass 24 to vibrate along a substantially lineal path parallel to axis XX'; i.e., in the plane of FIG. 2. The capacitances between pick-off electrode 11 and mass 24 and between mass 24 and the opposed pick-off electrode 22 likewise vary in a cyclic push-pull manner. The corresponding electric signal is used to excite, for example, a bridge oscillator, the output of which is returned to driver legs 53, 54 so that the beam is caused to sustain itself in resonant vibration at its natural vibration frequency. The sinusoidal beam drive signal is represented graphically by the upper curve 90 of FIG. 6. In accordance with the present invention, the electronic circuits are designed to track the natural resonance of the beam-mass so that the beam-mass vibration frequency is permitted to vary with time and temperature without undue influence on the sensor's scale factor.

Figure 6:
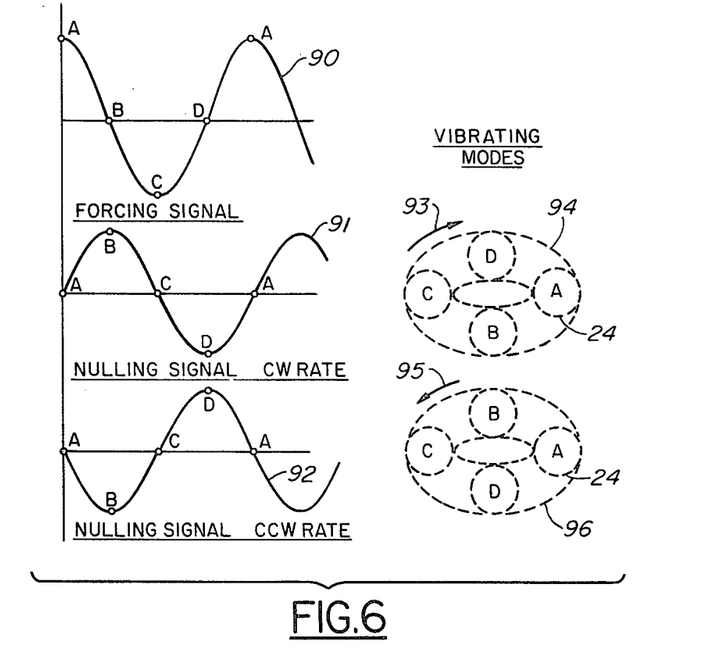
FIG. 6 is a diagram useful in explaining the operation of the invention.

Now, when the vehicle on which the sensor is mounted turns about the ZZ' axis, the lineal excursions of mass 24 along the XX' axis are modified in the manner and for the reasons described in the aforementioned Lyman et al patent so as to produce the two distinct elliptical vibrating modes 94, 96 of FIG. 6 for clockwise and counterclockwise rotations about axis ZZ', respectively. For example, should such rotation about axis ZZ' be clockwise Coriolis-induced acceleration forces act on the vibrating beam to produce vibration components at right angles to the XX', ZZ' plane at the beam drive frequency 90, relatively phased so that mass 24 moves in the sense of arrow 93 from A to B to C to D and thereafter continues to move in the cyclic elliptical path 94 as long as there is a rotation rate about the axis ZZ'. Should turning of the craft and of the sensor instrument about axis ZZ' be reversed, i.e., counter-clockwise but at the same rate, an elliptical path 96 having minor and major axes equal to those of ellipse 94 is followed; but now the path is traversed in the opposite direction, as indicated by arrow 95. In the Lyman et al patent, for example, the amplitude of the YY' axis vibration component is proportional to the turn rate. However, in accordance with the present invention, the excursions of mass 24 normal to the plane of the drawing produce capacity changes between pick-off electrode 67 and mass 24 and the opposed electrode 68 which vary in a cyclic push-pull manner as soon as there is any component of such orthogonal vibration. The resultant signal from pick-off 67, 68 is processed electronically and is fed back to energize the driver legs 54, 56 in a sense, illustrated by curves 91, 92 of FIG. 6, that is, 90 degrees out of phase with but at the same frequency as the drive axis signal, to produce an opposite vibration of base 34 and hence of the beam and mass of an amplitude required to reduce that component of vibration along axis YY', and hence the YY' axis pick-off signal, to null. The amplitude of the nulling signal or energization required is therefore proportional to the rate of turn producing the orthogonal vibration components.

Figure 4A:
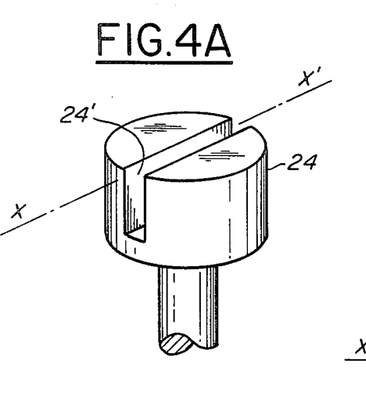
FIG. 4A is a perspective detail of the configuration of the inertial mass of the sensor.
Figure 4B:
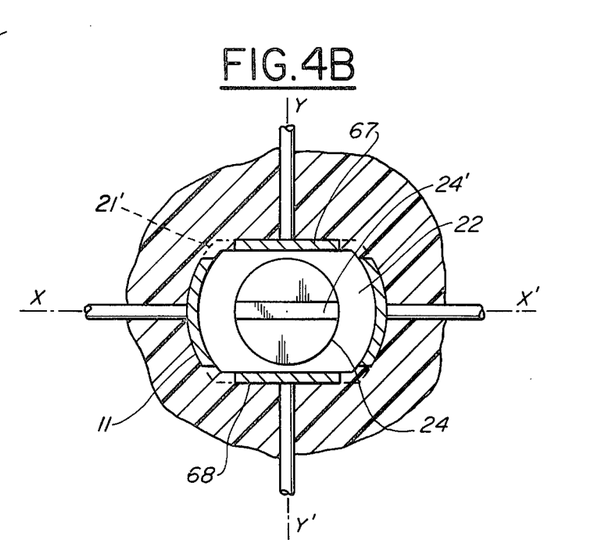
FIG. 4B is a cross section view of a modification of the pick-off end of the sensor.

As described, it is desirable to back-fill the lower sensor chamber with a suitable inert gas of a suitable density and pressure so as to provide a suitable clean and stable operating environment. However, it is possible that the resulting damping any result in a serious disadvantage if not taken into account. It will be appreciated that the amplitude of vibration in the primary XX', ZZ' plane between pick-off plates 11, 22 is quite small and that the corresponding gaps on the sides of mass 24 and these plates are correspondingly small. Therefore, with mass 24 vibrating between the plates, the gas molecules are alternately compressed, thereby producing forces which tend to oppose vibrational translation of mass 24 so that the mass tends to act as a pivot point about which the vertical drive forces produced by the drivers 53, 55 and acting on the base flange 34, tend to vibrationally translate the flange itself instead of mass 24. In other words, the beam-mass rotation axis, instead of being at the base of column 29, is near the top of the column as a result of the counter-force. In order substantially to eliminate this undesired gas pressure effect, mass 24 is provided with a deep slot 24' cut through mass 24 in alignment with the major vibration axis XX' (see FIG. 4A) to allow free passage of the gas molecules, thereby reducing the pressure build-up. A modification of the pick-off chamber in which mass 24 vibrates may also be employed further to reduce the gas compression effect. Referring to FIG. 4B, the chamber, instead of being round, is generally oval or elongated along the XX' axis, thereby increasing the gas volume between mass 24 and the pick-off plates. Since the vibration of mass 24 is restrained along the XX' axis by the feed back technique of the present invention, and since a high signal gain from orthogonal pick-off plates 67, 68 is desired, the spacing between mass 24 and those plates may remain small. It will be clear to those skilled in the art that other pressure relief configurations may be incorporated; for example, slot 24' may be replaced by one or more holes drilled through mass 24, or vertical slots or serrations on the outer surface thereof. Alternatively, the pressure relief configurations may be associated with the pick-off plates.

A further design consideration will be discussed in connection with the pick-off configuration of FIG. 4B, although it is also applicable to the FIG. 1 and 2 pick-off configurations. It is important that the interior surfaces of the pick-off opening in which the mass 24 vibrates be smooth and uninterrupted. For example, no cavities such as might be present between the pick-off plates and illustrated by dotted lines 21' in FIG. 4B should exist. If such cavities were present, they would create areas of low gas pressure and the vibrating mass 24 would tend to be drawn toward them, thereby causing mass 24 to vibrate in a plane other than the desired XX' plane and producing an undesired off-set zero output signal; that is, a signal indicating a finite turn rate when the turn rate is in fact zero.

The electrical circuit of FIG. 5 may be employed, according to the invention, to provide force balancing or nulling of the precession of mass 24 out of the preferred XX' plane upon turning of the craft and for providing an output signal proportional to the rate of such turning. The pairs of opposed driver electrodes 37, 38 and 65, 66 and the corresponding pairs of opposed pick-off electrodes 11, 22 and 67, 68 are shown schematically relative to the vibratory mass 24.

The capacitance pick-off plates 11, 22, in cooperation with the grounded mass 24, are connected to a conventional rectifier bridge oscillator 76 whose output is phase adjusted at 75, amplified by amplifier 74, and is coupled back to the associated driver electrodes 37, 38. In accordance with a feature of the invention, this assures that vibration of cantilevered beam 29 in the XX' plane is selfsustaining at a frequency determined by the natural frequency of beam 29 and hence the beam-mass vibratory frequency is free to vary with time and temperature and yet not influence the sensor's scale factor. The phase adjuster 75a may be required for initial system calibration.

The signal produced by a turn rate about the sensor ZZ' axis is, as indicated, provided by the YY' axis capacity pick-off plates 67, 68 (again cooperating with the mass 24), which signal is coupled to a second rectifier bridge oscillator 70 like bridge 76, whose output is then amplified by amplifier 69 and coupled back to the associated YY' axis driver electrodes 65, 66 in phase opposition to the detected motion of mass 24 in the YY'—ZZ' plane. Thus, vibration of cantilevered beam 29 at its resonant frequency in that perpendicular plane is driven to zero; i.e., it is nulled. The driving and forcing frequencies 90 and 91, 92 are substantially identical by virtue of the uniform beam-mass characteristics. Thus, it will be appreciated that, in response to a turning of the craft, the output of amplifier 69 is applied to driver electrodes 65, 66 in a phase such as to operate against the direction of the Coriolis-induced elliptical motion of beam 29 and hence will force the beam to vibrate in its preferred plane, the force required being proportional to the disturbing force; i.e., craft turn rate.

The output of driver amplifier 74 is additionally coupled via leads 77, 78 as a reference alternating supply to a conventional demodulator or phase detector 73, the output of the feed back amplifier 69 being coupled via lead 71 through a filter 72, if necessary, to demodulator 73 which demodulates the signal on lead 71 in phase opposition to the reference signal from amplifier 74 for providing a bipolar, variable magnitude direct current signal whose amplitude is a measure of the rate of turn and whose sign represents the direction of turning of the craft about the ZZ' axis of the sensor. Such a signal may be used by any utilization apparatus 79 on the aircraft requiring a measure of this parameter, such as for control purposes in a craft stability augmentation system, in a navigation computer or other flight control system, or to actuate a rate-of-turn indicator 80.

Figure 7:
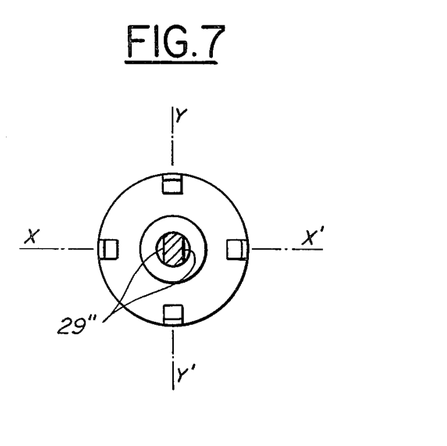
FIGS. 7 and 8 are views of a further alternative form of the invention.
Figure 8:
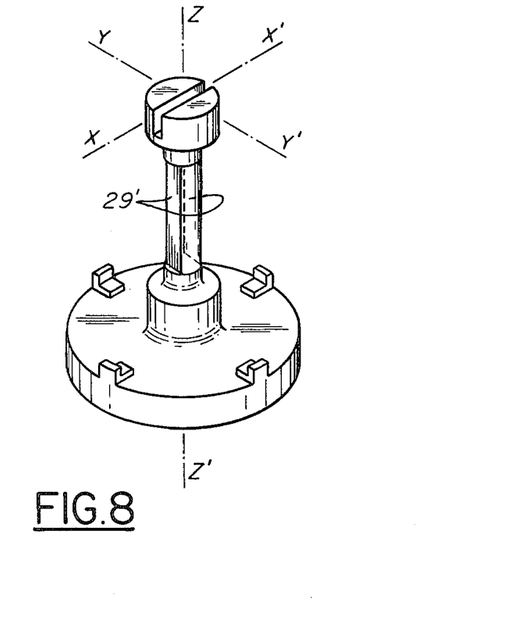

A desirable feature may be incorporated into the sensor beam-mass design to cause the resonant frequency in the output or nulling axis to be slightly greater than that in the drive axis. This feature assures that changes in beam or gas damping in the nulling axis do not introduce scale factor changes as a result of changes in the effective quality factor Q in the nulling axis. The over-all sensor scale factor will also be enhanced or enlarged by this modification. FIG. 7 illustrates a beam configuration providing the desired result. As shown, the cylindrical beam 29 is machined so as to provide diametrically opposed flat surfaces 29' on the XX' axis sides of the beam providing an increase in the resonant frequency of the beam along the YY' axis relative to that along the XX' axis. Alternatively, the beam cross section may be a rectangle having its long dimension along the YY' axis and its short dimension along the XX' as is shown at 29" in FIG. 8. In practice, the difference in the resonant frequencies along the XX' and YY' axes may be quite small; for example, that along the YY' axis may be three to five percent higher than that along the XX' axis.

Accordingly, it is now appreciated that the invention provides an inertial rate of turn sensor device of the vibratory type, but distinguished from prior art vibrating rate sensing devices by the use of a force feed back arrangement for maintaining the locus of the free end of a vibratory cantilevered beam in a nulled lineal path with respect to the casing of the instrument when subject to turn rate induced forces, the forces so required being proportional to the turn rate with all of the attendant advantages of feed back control systems. An important one of these advantages lies in the provision of a rate sensor, the scale factor of which is relatively constant over time and ambient environmental conditions. In the present invention, the feed back voltage required to prevent formation of an elliptical path is a direct measure of the amplitude of rate of turn of the sensor and hence of the craft upon which it is mounted, the sense of turn being determined by the positive or negative sense of the required coercing voltage.

In the described embodiment of the present invention, the vibration nodal planes of the vibratory beam 29, 24 are established well within the rigid pedestal and mount portion 30, 34 so that it will not change substantially with changing ambient conditions. The simple shape of the total vibratory element lends itself to high tolerance control in manufacture and minimum drift due to material nonhomogeneity. The pressure relief configurations desirably prevent vibration amplitude attenuation at the pick-off end of the beam and reduces any tendency of the beam to vibrate naturally in directions other than those parallel to XX' axis. Adverse thermal effects are substantially eliminated by virtue of the proximate location of the capacitive pick-off system and the sensor suspension support. Since the type of sensor used to measure the Coriolis-induced orthogonal vibratory components is not common to the cantilevered beam drive elements and because of self-tracking of the beam-mass resonance by means of the demodulator system, adverse thermal and time related influences are substantially eliminated and the sensor rate scale factor remains substantially constant.

Although not pertinent to the claimed structure or to the scope of the appended claims, it may be of practical interest to observe that the entire instrument including electronic circuits may be highly miniaturized, fitting into a cylindrical case whose outside dimensions may be about one and one half of two inches long by about three-quarters of an inch in diameter.

While the invention has been described in its preferred embodiments, it is understood that the words which have been used are words of description rather than of limitation and that changes may be made within the purview of the appended claims without departing from the true scope and spirit of the invention in its broader aspects.

What is claimed is:

1. A force feed back inertial rate sensor comprising:
a first support member,
a second support member,
an elongate beam cantilevered from said second support member, extending along a sensing axis about which rate of turn is to be measured, and having a free end,
first signal generating means coupled with and responsive to vibration of said free end in a first plane including said sensing axis,
first elongate drive means cantilevered from said first support member and coupled with said second support member and responsive to said first signal generating means for vibrating said elongated beam in said first plane at a frequency dependent upon the natural vibration of said elongate beam,
second signal generating means coupled with and responsive to vibration components of said free end in a second plane including said sensing axis and normal to said first plane due to rate of turn of said support member about said sensing axis, and
second elongate drive means cantilevered from said first and coupled with said second support member and responsive to said second signal generating means for vibrating said elongated beam in said second plane in a phase and amplitude such as to reduce the signal from said second signal generating means to zero whereby the signal supplied to said second driver means is proportional to said rate of turn about said sensing axis.

2. Apparatus as described in claim 1 wherein said first and second elongate drive means are each substantially as long as the length of said elongate beam and concentrically disposed thereabout.

3. Apparatus as described in claim 1 wherein said first and second elongate drive means include diametrically opposed pairs of elongate piezoelectric columns so shaped and so disposed as to provide a generally cylindrical internal opening therebetween and wherein said second support member is secured to said first and second pairs of columns with said elongate beam extending into said internal opening.

4. Apparatus as described in claim 3 wherein said elongate beam includes a mass portion at its free end, wherein said first support member comprises a support ring adapted to secure said device on a body the rate of rotation of which is to be measured, and wherein said support ring and mass portion are approximately coplanar.

5. Apparatus as described in claim 4 wherein said first and second signal generating means include capacitive pick-off means including first and second pairs of electrode means mounted on said support ring and said mass portion comprises a common electrode cooperative with said first and second pairs of electrodes.

6. Apparatus as described in claim 3 wherein said second support member includes a plurality of radially extending pads raised from said second support member and affixed to corresponding ends of said elongate piezo-electric columns so as to serve as hinged connections between said columns and said second support means.

7. Apparatus as described in claim 5 wherein said first signal generator means includes:
first opposed capacitive plate means capacity coupled to said beam free end, and
first rectifier bridge means responsive to said first opposed capacitive plate means,
said first drive means being responsive to said rectifier bridge means whereby the vibration frequency of said beam in said first plane tracks the resonant frequency of said beam.

8. Apparatus as described in claim 7 wherein said second signal generator means includes:

second opposed capacitive plate means capacitively coupled to said beam free end, and second rectifier bridge means responsive to said second opposed capacitive plate means, said second drive means being responsive to said second bridge rectifier means for suppressing vibration frequency components in said second plane.

9. Apparatus as described in claim 8 further including:

demodulator means having first and second inputs, said first and second inputs being respectively responsive to said first and second bridge rectifiers, and utilization means responsive to said demodulator means.

10. Apparatus as described in claim 5 wherein said inertial rate sensor is enclosed within a sealed housing containing a gas medium for a long term ambient control and wherein said capacitive pick-off means includes gas pressure relief configurations whereby the amplitude of vibration of said mass portion between said first and second pairs of electrodes is not significantly attenuated.

11. Apparatus as set forth in claim 9 wherein said inertial rate sensor is enclosed within a housing including two chambers, one of said chambers containing said support members, drive means, and signal generating means and the other of said chambers including said rectifier bridge means and said demodulator means, said one chamber being hermetically sealed from said other chamber.

12. Apparatus as described in claim 1 wherein said elongate beam is characterized by a natural frequency in said second plane different from its natural resonant frequency in said second plane.

13. Apparatus as described in claim 12 wherein the natural resonant frequency of said elongate beam in said second plane is higher than its natural frequency in said first plane.

14. Apparatus as described in claim 13 wherein said first and second signal generating means include:

first and second opposed capacitive plate means coupled with said beam free end, and first and second rectifier bridge means responsive to said first and second respective capacitive plate means, said first and second drive means being responsive to said first and second bridge means, respectively, whereby the vibration frequency of said elongate beam in said first plane tracks the resonant frequency of said elongate beam in said first plane and the vibration frequency of said elongate beam in said second plane tracks the resonant frequency of said elongate beam in said second plane.

15. A force feed back inertial rate sensor for providing a measure of the rate of turn thereof about a sensing axis comprising:

a substantially rigid sensor support ring generally defining the sensing axis of said sensor and adapted to secure said sensor to a craft the turn rate of which about said axis is to be measured, an elongate cylindrical driver means of piezoelectric material having one end thereof secured to said support ring and having its axis coincident with and extending along said sensing axis, the other end of said driver means being formed in quadrants providing two pairs of diametrically opposed, orthogonal actuator elements, each pair of elements including electrodes adapted to be energized to produce opposed elongation and contraction thereto in the direction of said axis, an elongate beam having a flanged base portion secured to the ends of said actuator elements with said beam extending interiorly along said axis and its free end terminating closely adjacent said sensor support ring, first and second pairs of diametrically opposed pick-off means secured to said sensor ring adjacent said beam free end and axially aligned with corresponding pairs of said actuator elements for detecting motion of the beam free end in first and second orthogonal planes defined by said corresponding pick-off means and actuator elements, first electronic means coupled between said first pair of pick-off means and corresponding actuator elements for energizing said first pair of actuator elements so as to vibrate said beam through said beam base portion in said first plane at the natural resonant frequency of said beam, second electronic means coupled between said second pair of pick-off means and corresponding actuator elements and responsive to any components of said beam vibration in said second plane produced by a turn rate of said sensor about said sensing axis for energizing said second pair of actuator elements and vibrating said beam through said beam base portion in said second plane at said resonant frequency, the sense of said energization-producing vibration of said beam being such as to oppose said vibration component in said second plane whereby to reduce the same toward zero and thereby maintain vibration of said beam in said first plane, and means responsive to said second electronic means for providing said rate of turn measure.

* * * * *